United States Patent
Paknad et al.

(10) Patent No.: US 8,200,690 B2
(45) Date of Patent: Jun. 12, 2012

(54) SYSTEM AND METHOD FOR LEVERAGING HISTORICAL DATA TO DETERMINE AFFECTED ENTITIES

(75) Inventors: Deidre Paknad, Palo Alto, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 12/214,935

(22) Filed: Jun. 23, 2008

(65) Prior Publication Data

US 2008/0288479 A1    Nov. 20, 2008

Related U.S. Application Data

(63) Continuation-in-part of application No. 11/505,537, filed on Aug. 16, 2006.

(51) Int. Cl.
*G06F 7/00* (2006.01)
*G06F 17/30* (2006.01)

(52) U.S. Cl. ..................... 707/768

(58) Field of Classification Search .................. None
See application file for complete search history.

(56) References Cited

U.S. PATENT DOCUMENTS

| | | | |
|---|---|---|---|
| 5,355,497 A | 10/1994 | Cohen-Levy | |
| 5,701,472 A | 12/1997 | Koerber et al. | |
| 5,903,879 A | 5/1999 | Mitchell | |
| 6,115,642 A | 9/2000 | Brown et al. | |
| 6,128,620 A | 10/2000 | Pissanos et al. | |
| 6,151,031 A | 11/2000 | Atkins et al. | |
| 6,173,270 B1 | 1/2001 | Cristofich et al. | |
| 6,332,125 B1 | 12/2001 | Callen et al. | |
| 6,343,287 B1 | 1/2002 | Kumar et al. | |
| 6,401,079 B1 | 6/2002 | Kahn et al. | |
| 6,539,379 B1 | 3/2003 | Vora et al. | |
| 6,622,128 B1 | 9/2003 | Bedell et al. | |
| 6,738,760 B1 | 5/2004 | Krachman | |
| 6,944,597 B2 | 9/2005 | Callen et al. | |
| 7,076,439 B1 | 7/2006 | Jaggi | |
| 7,127,470 B2 | 10/2006 | Takeya | |
| 7,197,716 B2 | 3/2007 | Newell | |
| 7,283,985 B2 | 10/2007 | Schauerte et al. | |
| 7,386,468 B2 | 6/2008 | Calderaro et al. | |
| 7,433,832 B1 | 10/2008 | Bezos et al. | |
| 7,895,229 B1 | 2/2011 | Paknad | |
| 2002/0007333 A1 | 1/2002 | Scolnik et al. | |
| 2002/0010708 A1 | 1/2002 | McIntosh | |
| 2002/0022982 A1 | 2/2002 | Cooperstone et al. | |

(Continued)

OTHER PUBLICATIONS

Zhu et al., "Query Expansion Using Web Access Log Files", Lecture Notes in Computer Science, 2005, vol. 3588/2005, pp. 686-695, Springer-Verlag Berlin Heidelberg, 2005.*

(Continued)

*Primary Examiner* — Michael Hicks
(74) *Attorney, Agent, or Firm* — Shumaker & Sieffert, P.A.

(57) ABSTRACT

Systems and methods for leveraging historical data to determine affected entities is provided. In exemplary embodiments, a current matter is created. When creating the current matter, at least one initial scope parameter for the current matter is known. Historical data associated with the at least one initial scope parameter may then be accessed and review. Based on the historical data, one or more refined scope parameter may be determined. A list of affected entities based at least on the one or more refined scope parameter is provided.

20 Claims, 7 Drawing Sheets

U.S. PATENT DOCUMENTS

| | | |
|---|---|---|
| 2002/0083090 A1 | 6/2002 | Jeffrey et al. |
| 2002/0103680 A1 | 8/2002 | Newman |
| 2002/0143595 A1 | 10/2002 | Frank et al. |
| 2002/0143735 A1 | 10/2002 | Ayi et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0046287 A1 | 3/2003 | Joe, Jr. |
| 2003/0051144 A1 | 3/2003 | Williams |
| 2003/0069839 A1 | 4/2003 | Whittington et al. |
| 2003/0097342 A1 | 5/2003 | Whittingtom |
| 2003/0110228 A1 | 6/2003 | Xu et al. |
| 2003/0229522 A1 | 12/2003 | Thompson et al. |
| 2004/0034659 A1 | 2/2004 | Steger |
| 2004/0060063 A1 | 3/2004 | Russ et al. |
| 2004/0068432 A1 | 4/2004 | Meyerkopf et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0138903 A1 | 7/2004 | Zuniga |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0260569 A1 | 12/2004 | Bell et al. |
| 2005/0071251 A1 | 3/2005 | Linden et al. |
| 2005/0114241 A1 | 5/2005 | Hirsch et al. |
| 2005/0203821 A1 | 9/2005 | Petersen et al. |
| 2006/0095421 A1 | 5/2006 | Nagai et al. |
| 2006/0136435 A1 | 6/2006 | Nguyen et al. |
| 2006/0230044 A1 | 10/2006 | Utiger |
| 2007/0100857 A1 | 5/2007 | DeGrande et al. |
| 2007/0156418 A1 | 7/2007 | Richter et al. |
| 2007/0162417 A1 | 7/2007 | Cozianu et al. |
| 2007/0271517 A1 | 11/2007 | Finkelman et al. |
| 2009/0037376 A1 | 2/2009 | Archer et al. |

OTHER PUBLICATIONS

Abecker et al., "Business-process oriented delivery of knowledge through domain ontologies", Proceedings of the 12th international workshop on Database and Expert Systems Applications, pp. 442-446, 2001, IEEE.*

"mySAAP ERP Human Capital Management: Maximizing Workforce Potential", <a href="http://web.archive.org/web/20060823140053/www.sap.com/solutions/businesss-suite/erp/hcm/index.exp"?http://web.archive.org.web/2006...</a>.

www.pss-systems.com retrieved from www.archive.org any linkage Dec. 5, 2008.

www.pss-systems.com retrieved from www.archive.org Dec. 8, 2005.

* cited by examiner

SYSTEM AND METHOD FOR LEVERAGING HISTORICAL DATA TO DETERMINE AFFECTED ENTITIES

CROSS-REFERENCE TO RELATED APPLICATIONS

The present application is a continuation-in-part application and claims the benefit of U.S. patent application Ser. No. 11/505,537 filed Aug. 16, 2006, entitled, "Systems and Methods for Utilizing an Enterprise Map to Determine Affected Entities;" which is hereby incorporated by reference. The present application is also related to U.S. patent application Ser. No. 11/505,665 filed Aug. 16, 2006, entitled "Systems and Methods for Utilizing Organization-Specific Classification Codes;" U.S. patent application Ser. No. 11/512,880, filed Aug. 29, 2006 and entitled "Systems and Methods for Providing a Map of an Enterprise System;" and U.S. patent application Ser. No. 11/807,145 filed May 24, 2007 and entitled "Conducting Cross-Checks on Legal Matters Across an Enterprise System" all of which are hereby incorporated by reference.

BACKGROUND

1. Field of the Invention

Embodiments of the present invention relate generally to data management and more particularly to utilizing historical data to determine currently affected entities.

2. Background Art

Conventionally, information retrieval is accomplished by searches using keywords, people, and dates. If a specific set of information is sought, very specific parameters may need to be input into a system that maintains the information in order to locate the set of information.

For litigation purposes, data and evidence within a company is required to be preserved in anticipation of, or during, litigation. Traditionally, the company will identify affected employees and systems likely to be associated with the litigation related data and evidence. In large companies, however, the identification of affected employees and systems is often complex due to a distributed and often-changing business structure and vast and ever-growing information landscape. However, it is vital that the company quickly identify affected employees who may have relevant data and systems where potentially relevant information may reside.

It is desirable to identify these affected employees and systems as quickly as possible in order to ensure proper preservation of evidence (e.g., data) and collection of the evidence. To preserve and collect the data, the affected employees will need to be notified and possibly interviewed. If the company fails to effectively and quickly preserve and collect the evidence, the company may face significant legal and economic penalties (e.g., sanctions and fines).

Conventionally, individuals manually determine the affected and involved people in a legal matter. There is typically no purpose-built application to perform this determination. Instead, it is usually a manual process using interviews, research through employee directories and organizational charts, and so forth.

Manually determining affected people and systems involved in a particular matter is time intensive, error prone, and potentially costly. Many legal matters relate to similar issues, affecting similar people, organizations, processes or functions. The knowledge created while identifying individuals and systems involved in past matters may be highly applicable and reusable in the context of future matters. While reusing this knowledge may provide significant gain in terms of time and cost, finding and identifying which part of the existing knowledge base may be applicable is a difficult process.

SUMMARY

Embodiments of the present invention provide systems and methods for leveraging historical data to determine affected entities. In exemplary embodiments, a current matter is created. In some embodiments, the current matter may be a legal matter in which an enterprise is involved. When creating the current matter, at least one initial scope parameter for the current matter is known. The initial scope parameter indicates a search parameter which may be utilized to derive a list of affected entities associated with the current matter. By identifying affected entities, proper instructions may be given, notifications sent, and actions may be performed to preserve and collect relevant data related to the current matter.

Historical data associated with the at least one initial scope parameter may then be accessed and reviewed. In exemplary embodiments, historical data may be generated by tracking any actions performed on previous matters within the enterprise. Information with respect to the actions (e.g., times, reasons) may be recorded and can be subsequently accessed and reviewed.

Based on the historical data, one or more refined scope parameter may be determined. In exemplary embodiments, the initial scope parameters may be referenced against historical data to determine refined scope parameters. A list of affected entities based at least on the one or more refined scope parameter may then be generated and provided. In some embodiments, the initial and refined scope parameters may comprise affected entities.

DETAILED DESCRIPTION OF EXEMPLARY EMBODIMENTS

Embodiments of the present invention provide an exemplary system and method for utilizing historical data in order to determine affected entities in a current matter. In exemplary embodiments, the determination of affected entities may be expedited by using knowledge of, or related to, affected entities established while processing previous matters (i.e., historical data). The historical data may be associated with an enterprise map. These entities may comprise people and systems in, or associated with, an enterprise. Affected people may comprise, for example, individual employees, record coordinators and administrators responsible for a class of information or associated with an information repository, and system administrators and IT staff responsible for the information repositories along with names, contact information, e-mail addresses, organizations, and location of the employees. Affected systems may comprise the repositories storing the data of interest. In some embodiments, the affected people may have physical possession of data of interest (e.g., evidence in a litigation matter).

As affected entities are identified for matters, a knowledge base of information is being created. The knowledge base may be refined over time as data is collected from the affected entities, entities not involved in the matter are removed from an affected entities list, and/or further affected entities are identified based on the collected data, for example. The knowledge base may also be refined as a scope of the matter is refined. Exemplary embodiments of the present invention take advantage of this knowledge base to quickly and effectively identify affected entities in a new matter.

Figure 1:
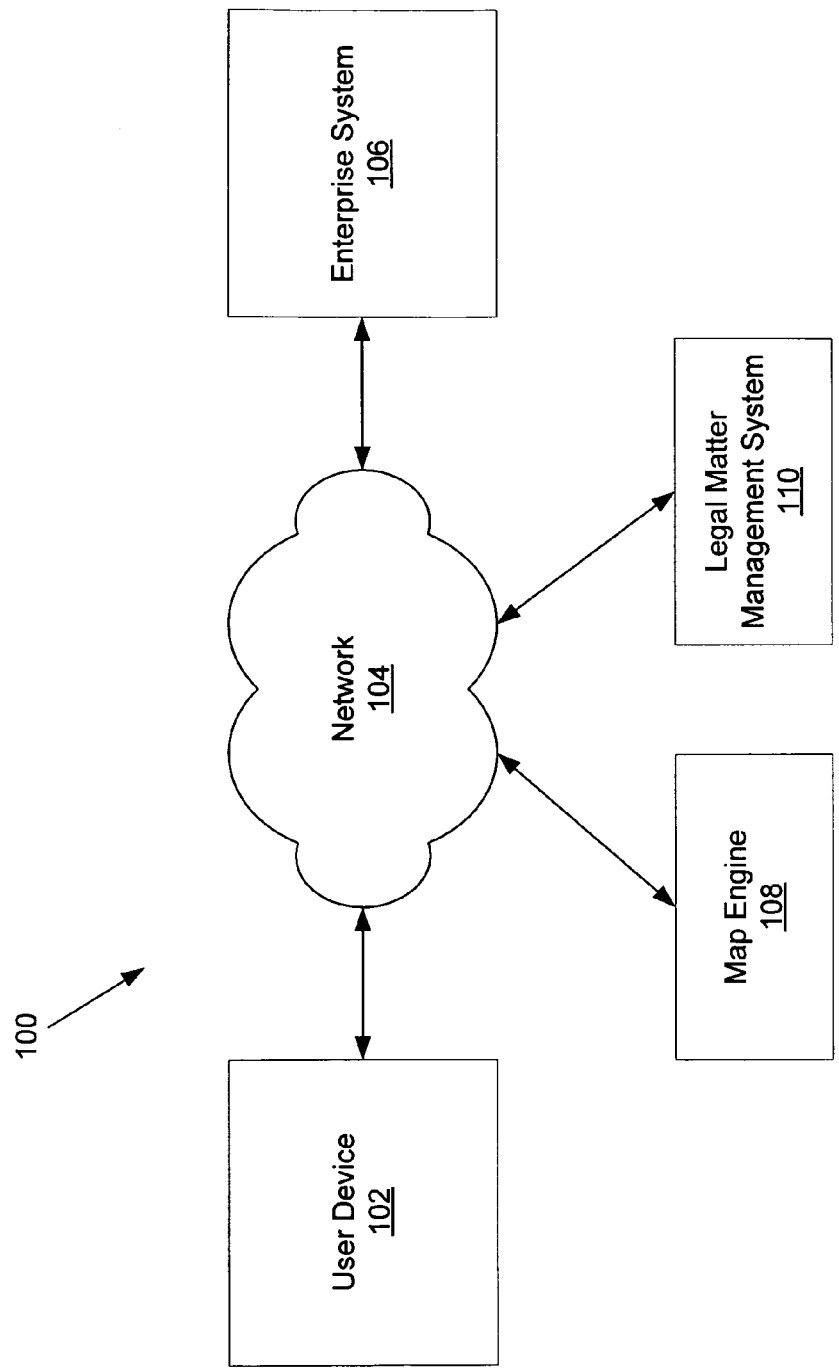
FIG. 1 is an exemplary environment in which embodiments of the present invention may be practiced.

FIG. 1 shows an exemplary environment 100 in which embodiments of the present invention may be practiced. The environment 100 comprises at least one user at a user device 102 coupled via a network 104 to an enterprise system 106. In exemplary embodiments, the network 104 may be a local area network, a wide area network, peer-to-peer network, or the Internet. Alternatively, the user device 102 may be coupled directly to the enterprise system 106 or access the enterprise system 106 from within the enterprise system 106. In some embodiments, more than one network and/or more than one type of network may be utilized to allow the components of the environment 100 to communicate with each other.

Any number of users and user devices 102 may be present in the environment 100. The user may be an individual accessing the enterprise system 106 in order to determine affected people and systems associated with a matter. In exemplary embodiments, the matter is related to a litigation matter. In these embodiments, the user may comprise an attorney or legal staff associated with the litigation matter. However, in alternative embodiments, the matter may be related to any matter of interest to the user (e.g., tax, regulatory, internal investigation, policy-related examination or investigation, audit).

In some embodiments, the user device 102 may comprise an optional business application (not shown) that performs actions related to the map. For example, the business application may interact with a litigation management engine 110 to derive a list of people and systems affected by a litigation matter. In an alternative embodiment, the business application may comprise the litigation management engine 110 and/or the map engine 108. In other embodiments, the business application interacts with a user interface module in the map engine 108 and/or the litigation management engine 110, as will be discussed below.

The exemplary enterprise system 106 may comprise any number of servers, client devices, and repositories comprising data. The enterprise system 106 may further comprise a totality of IT, storage and information management systems in an enterprise, including those internally managed, outsourced, etc. The data may comprise documents, files, audio and video media, e-mail communication, and any other information which may be stored in repositories. Repositories may comprise both physical and digital storage media including warehouses, filing cabinets, hard drives, and other digital media storage devices. The repositories may be located anywhere in an enterprise (e.g., in different jurisdictions).

The exemplary map engine 108 maintains a map comprising a structure that represents people, repositories, organizations, and documents via relationships. The map engine 108 utilizes information types, organizations, storage locations, people, and other objects and their relationships, as will be discussed in more detail in connection with FIG. 2, to provide an overall map structure that is used to derive relationships between people, repositories, and organizations. As a result, the user can use the map to determine affected people and systems (e.g., affected entities) in the enterprise system 106. While the map engine 108 is shown coupled to the enterprise system 106, the map engine 108 may be comprised within the enterprise system 106. Further details regarding the map engine 108 may be found in co-pending U.S. patent application Ser. No. 11/505,537 entitled "Systems and Methods for Utilizing an Enterprise Map to Determine Affected Entities," and U.S. patent application Ser. No. 11/512,880 entitled "Systems and Methods for Providing a Map of an Enterprise System," which are incorporated by reference.

The legal matter management system 110 is configured to allow users to manage preservation and production of data associated with legal matters. The exemplary legal matter management system 110 is discussed herein as being utilized to determine affected people and systems associated with legal or litigation matters based on historical data. However, the legal matter management system 110 may be used to determine affected entities for any reason. For example, the user may use the legal matter management system 110 to find affected people and systems associated with a merger transaction in order to review, hold/preserve, or collect certain documents, or to interview the affected people. While the legal matter management system 110 is shown coupled to the enterprise system 106, the legal matter management system 110 may be comprised within the enterprise system 106. The legal matter management system 110 will be discussed in more detail in connection with FIG. 3.

It should be noted that the environment 100 of FIG. 1 is exemplary. Alternative embodiments may, for example, comprise the various components of the environment 100 in communication with each in a different manner. For example, the user device 102, the map engine 108, and the legal matter management system 110 may all, or in various combinations, be comprised within the enterprise system 106.

Figure 2:
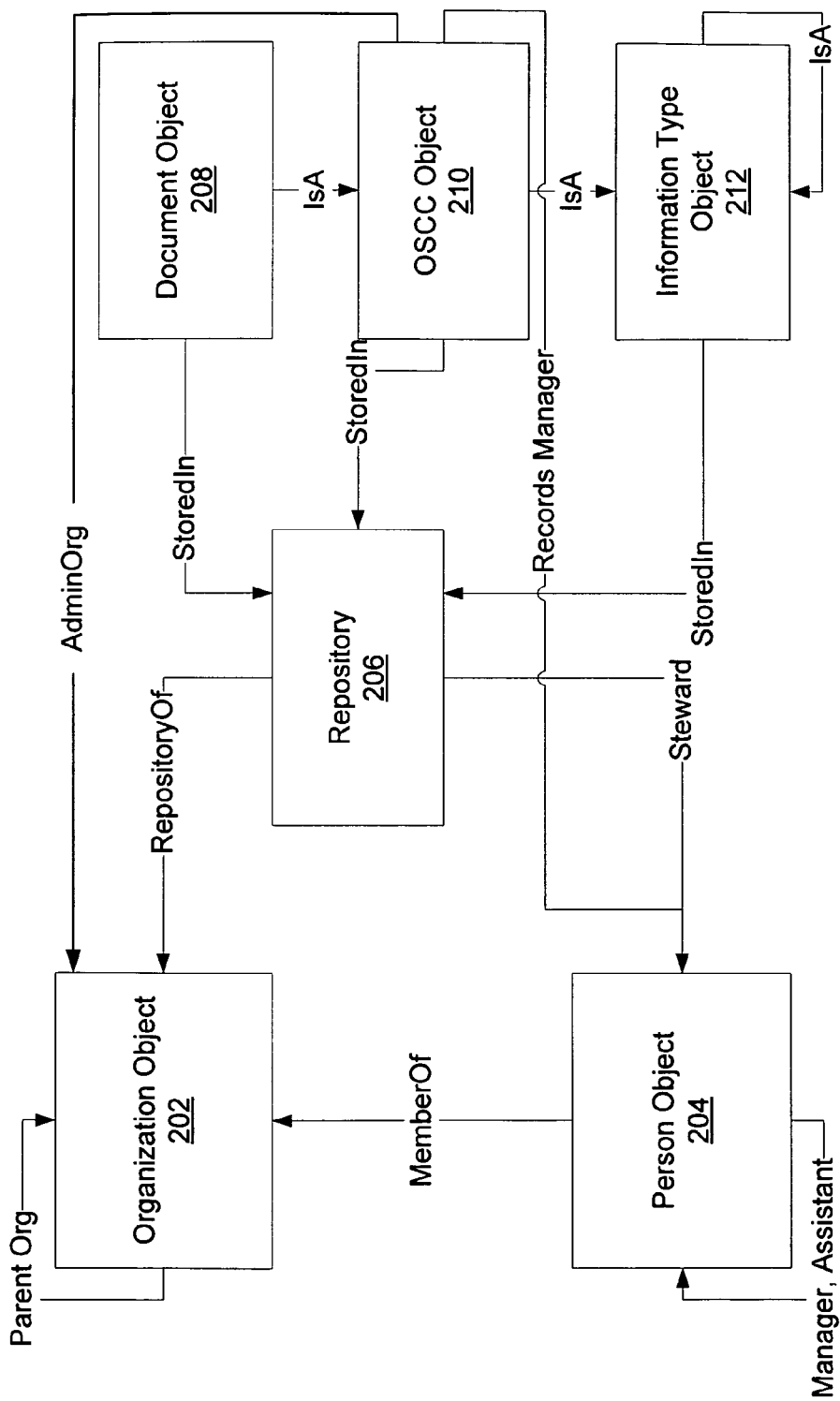
FIG. 2 is a schematic diagram of exemplary relationships between objects within a map of an enterprise.

FIG. 2 illustrates a schematic diagram of exemplary relationships of primary objects in the map used for supporting derivation of a list of affected people and/or systems. Exemplary embodiments of the present invention take advantage of the fact that people have certain types of relationships to organizations, and information repositories have a responsible person/people (i.e., stewards) and associated disposal and retention policies. The relationships may be based on such objects as organizations, author, and repository, for example. In exemplary embodiments, the structure of the map is based on the relationships between these objects. As discussed herein, the map establishes exemplary relationships between the objects as shown.

In exemplary embodiments, each document is classified with an organization specific classification code (OSCC). The OSCC identifies both an information type and an organization within a single classification code. Any number of organizations may comprise the enterprise system 106. For example, ADM-212 may be an OSCC only utilized by a New York office (i.e., organization) of an investment bank to classify administrative internal memos (i.e., information type).

Each OSCC may also have a policy associated with the OSCC. All documents having the particular OSCC are subject to the same policy. These policies may comprise a custodian (i.e., storage location), a record manager, and other important information which is pertinent to all documents sharing the OSCC. In some embodiments, the policy may also comprise information such as a retention period, security and access, and legal holds.

Because the OSCC provides an intrinsic relationship between the organization, information type, and any policies associated with the OSCC, a user is able to find relevant information more easily and quickly. Based on people, custodians, organizations, or information types known to be relevant to a legal matter, for example, a subset of all enterprise OSCCs can be derived that are relevant to the legal matter. More specifically, the user can search for a specific OSCC and identify systems and people associated with the legal matter. In further embodiments, the user may be able to search for and identify exact data and/or evidence that are classified with a given OSCC.

An organization object 202 includes information about the organization or other groupings of people. In some embodiments, these organizations may be hierarchically organized. Any type of organization object 202 may be utilized. For example, the organization object 202 may include a name of the organization, a parent organization, persons in the organization, repositories or storage mediums utilized by the organization, geography associated with the organization, organization locations, accounting codes, and so forth. One or more organizations may be represented by the organization object 202 and the one or more organizations may be designated according to a hierarchical structure, such as a parent organization.

A person object 204 represents an individual with a role within the organization. For example, the person object 204 may include an employee in the organization. The person object 204 may be associated with one or more items of information by a name, contact information, role in the organization, relationship with other persons 204, organizational affiliations, repository affiliations, responsibilities, job title, and so forth. The person object 204 may be related to the organization object 202 by virtue of a "MemberOf" relationship, which indicates that each person is a member of one or more organizations. For example if a person works at a NY office of an investment bank, the user (i.e., person object 204) is affiliated with the NY office (i.e., organization object 202).

A repository object 206 represents storage locations. The repository object 206 may include any electronic or non-electronic information repositories, such as a warehouse, a file server, or any other storage mediums. The repository object 206 may include or be related to name, system type and details, physical location, network location, access methods, stewards (i.e., the persons and the person object 204 responsible), the organizations that use the repository (e.g., organization object 202), information types stored in the repository (e.g., information type object 212), and so forth. Accordingly, the repository object 206 has a relationship with the other objects shown in FIG. 2.

A document object 208 represents information about documents, papers, text, files, metadata, and other items of data stored in a repository. The information represented by the document object 208 is thus related to the repository object 206 by being stored in the repository identified by the repository object 206.

An OSCC object 210 is associated with a classification code (i.e., the OSCC) assigned to each item of data associated with the document object 208. The OSCC object 210 may indicate information type, location in the repository 206 for the information, policy information, such as a records manager, and so forth. Once the OSCC object 210 is assigned to the item of data associated with the document object 208, the classification may be stored in a repository associated with the repository object 206. Each classification may be associated with one or more persons responsible for managing the information assigned the specific classification. Thus, the person object 204 may be related to the OSCC object 210.

In exemplary embodiments, information represented by the document object 208 is an instance of the OSCC object 210. In other words, the information represented by the document object 208 is one of many possible specific occurrences that belong to the generic information classification defined by the OSCC. For example, an offer letter of an employee of a New York branch of a company will belong to the classification code "Employment agreement" (i.e., OSCC) for the "New York Division" organization.

An information type object 212 is associated with the OSCC object 210 classification. The items of data may be organized as a hierarchical taxonomy, for example, utilizing the information type. The information type object 212 includes name, identifiers, such as record keeping codes, parent type, repository affiliations (i.e., default location for the information), organization affiliations, and so forth. An information type is a broad class of information, such as "Accounting Invoice" or "Quarterly Financial Report", for example. A data type or document may, optionally, be associated with one or more repositories via the repository object 206 discussed herein. Accordingly, the information type object 212 is related to the repository object 206 and to the OSCC object 210. In exemplary embodiments, the OSCC is a more specific class of information that a given information type uses within a given organization.

The map engine 108 utilizes the relationships between the various objects described in FIG. 2 to generate the map. Although FIG. 2 specifies the relationship between the various objects and the various objects that may have specified relationships, any type of relationships may be identified between any of the objects.

Because various relationships between the one or more objects are known, the one or more items of data that may satisfy a matter may be more easily located and/or provide better and more accurate results. As discussed herein, the litigation management engine 110 can determine affected people and systems using the objects and their relationships. Although FIG. 2 shows various relationships between various objects that represent the information in the enterprise system 106, further embodiments may comprise other objects and/or relationships between the objects and still fall within the scope of various embodiments. It should be noted that in some embodiments, the object may comprise meta-data.

Figure 3:
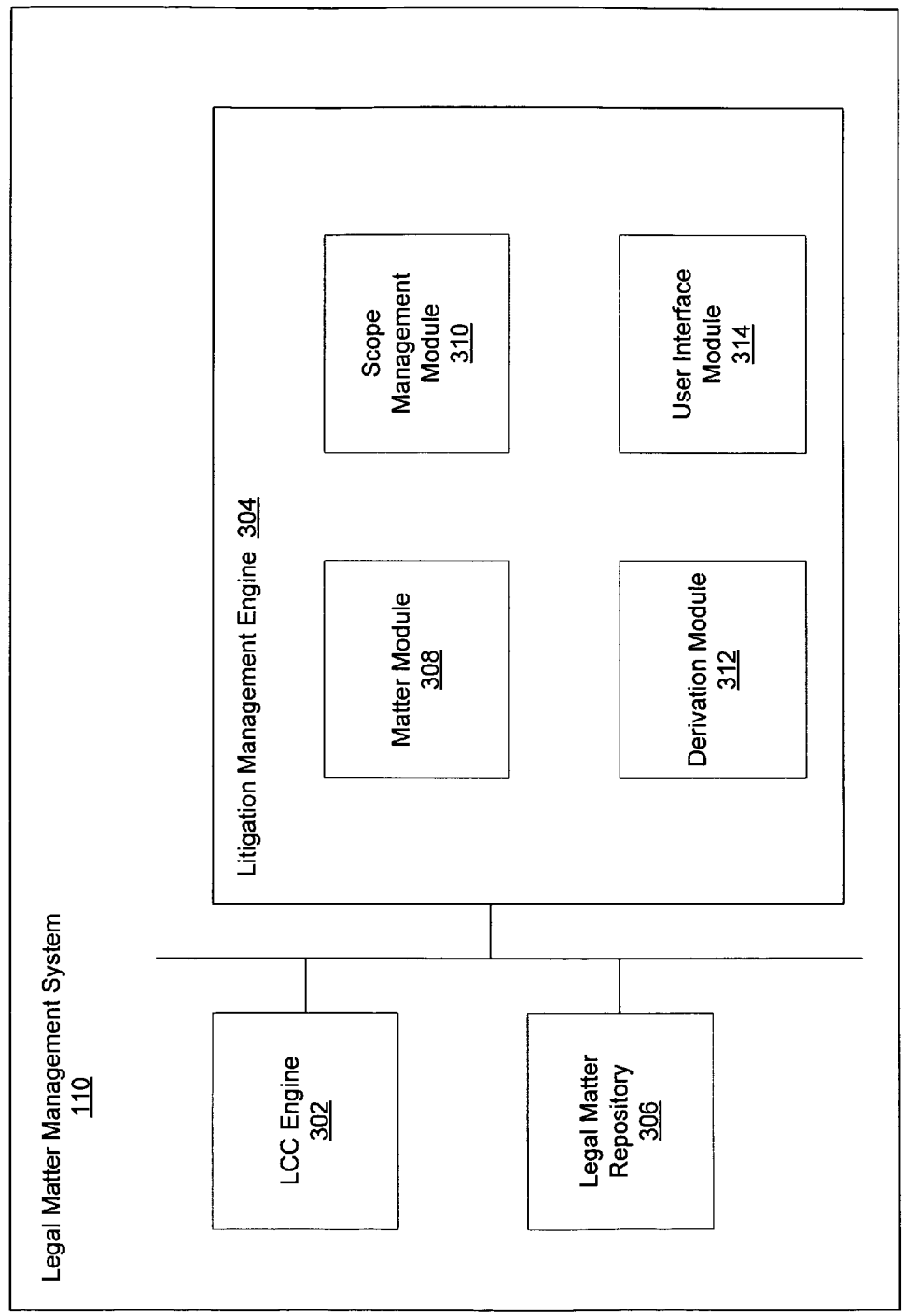
FIG. 3 is a block diagram of an exemplary legal matter management system.

Referring now to FIG. 3, a detailed block diagram of the exemplary legal matter management system 110 is shown. In exemplary embodiments, the legal matter management system 110 comprises a legal communication and collections (LCC) engine 302, a litigation management engine 304, and a legal matter repository 306 configured for storing legal matter information. The LCC engine 302 will be discussed in more detail in connection with FIG. 4. While FIG. 3 is discussed in a context of a legal matter search, alternative embodiments allow for the search to be associated with non-legal or litigation matters (e.g. internal investigations, government regulatory request for information, etc.).

The litigation management engine 304 manages the legal matters within the enterprise system 106, and comprises a matter module 308, a scope management module 310, a derivation module 312, and a user interface module 314. Alternative embodiments may comprise more, less, or functionally equivalent modules. Furthermore, some of the modules of the litigation management engine 304 may be comprised in the map engine 108 or vice versa. While the litigation management engine 304 will be discussed in a context of a litigation matter and search, alternative embodiments allow for the search to be associated with non-litigation matters (e.g. internal investigations, government regulatory request for information, etc.).

In some embodiments, some of the components of the litigation management engine 304 are located at the user device 102, and operate within the user device 102 to provide the functionalities described below. In other embodiments, the litigation management engine 304 is completely located at the user device 102. In yet other embodiments, the litigation management engine 304 is completely separate from the user device 102, and the user device 102 accesses the litigation management engine 304 via the network 104.

The exemplary matter module 308 creates and maintains the matter which is managed by the legal matter management system 110. The matter identifies a legal matter for which affected people & systems are being determined (e.g., derivation of a list of affected entities). The matter may also identify the attorneys and other staff that are working on the matter. By identifying the relevant staff, work flow may be automatically generated for the staff upon determination of the affected people and systems. Furthermore, results of the derivation may be stored based on the matter. In accordance with exemplary embodiments, affected entities for the new matter may be identified by using historical data (i.e., knowledge base) compiled from previous matters (e.g., previously created and maintained matters for other events or litigation), as will be discussed in more detail herein.

The scope management module 310 is configured to receive initial scope parameters from the user for the derivation of key people and systems (e.g., the affected entities). In some embodiments, the scope management module 310 provides a graphical user interface (GUI) that allows the user to provide the initial scope parameters. In exemplary embodiments, the initial scope parameters may comprise one or more map objects that are known to intersect the matter in some manner. For example, if the matter involves a specific organization or information type, the user can provide those objects as the scope parameters. It should be noted that any number of initial scope parameters may be utilized. Scope and map objects were discussed in detail in connection with FIG. 2.

In exemplary embodiments, the derivation module 312 is configured to use the initial scope parameters and/or refined scope parameters, as discussed below, to traverse the map in order to determine the affected people and systems (i.e., affected entities) associated with the matter based on relationships identified within the map. In some embodiments, the derivation module 312 may work with one or more components of the map engine 108 to traverse the map. Thus, for example, knowing at least one root element (e.g., an object) associated with the matter, further objects and/or the affected people and systems may be derived. For instance, for a given organization specific classification code (OSCC), items of data classified by the OSCC may be stored in a particular information repository (e.g., file share or document management system). Typically, there is a steward (i.e., a person responsible for the information record keeping) for each repository. These stewards are affected people which need to be notified about the litigation matter.

The exemplary derivation module 312 may further be configured to extract and reuse patterns and information (i.e., historical data) captured from previous matters. As such, the derivation module 312 may identify entities based on past affiliations, on various criteria within previous matters, and on previously collected data. The derivation module 312 may further identify additional affected entities or refined scope parameters based on similar patterns and identify previous matters with similar patterns (e.g., to reuse part or all of the affected list from the previous matter). Various pattern extraction methods will be discussed in detail below.

In one embodiment, the derivation module 312 identifies and uses past affiliation of affected entities. As will be discussed, a historical data module tracks entities as well as actions associated with affected entities. For example, if initial scope parameters include a specific organization and period of time, the derivation module 312 may identify persons that belonged to, or are associated with, the specific organization during the period of time (or from a particular date to the present). The identified persons may comprise, for example, record coordinators responsible for information related to the organization, IT staff for information repositories belonging to the organization, IT staff in charge of managing or supervising discovery process of information or systems related to the organization. In another example, systems used to store documents belonging to affected classes of information for the specific organization during the time period may be identified.

In a second embodiment, the derivation module 312 may extract affected scope parameters and filters (i.e., refined scope parameters) based on the historic data for a known previous matter. For example, if the initial scope parameter comprises a known previous matter that is fairly related to a current matter, historical data associated with the related previous matter may be reviewed to extract the refined scope parameters. In exemplary embodiments, the refined scope parameters may comprise a date and reason why an entity was added to the previous affected list, whether the entity remained on the previous affected list, and/or date and reason for removing the entity. In some embodiments, the refined scope parameters may also comprise notifications, preservation obligations, compliance status, collected evidence, interview responses, and any other notes or actions taken by legal staff related to the entity within the context of the previous matter. The refined scope parameters may then be used by the derivation module 312 to determine the affected entities or further refined scope parameters in accordance with some embodiments.

In a third embodiment, the derivation module 312 utilizes a correlation (i.e., cross check) approach. In this embodiment, the derivation module 312 identifies additional affected entities or refined scope parameters based on similar patterns of relationships shared with already known scope parameters, such as affected entities or other objects. In some cases, the known affected entities may be previously identified by the derivation module 312 and used for further scoping by the derivation module 312.

For instance, starting with an affected scope parameter already associated with the current matter, a list of all previous matters and projects (e.g., temporary matter) associated with the affected scope parameter is determined. Subsequently, a list of other scope parameters associated with the list of all previous matters may be generated (e.g., affected entities of the previous matters). Using this list of other scope parameters, a strength of correlation may be established for each of the other scope parameters. The strength may be based, for example, on a number of related legal matters or projects. Most likely affected entities may then be added to the affected entity list based on the strength of correlation.

For example, Joe Smith is a known affected person in a new litigation matter. Embodiments of the present invention comprises knowledge (e.g., based on historical data) of a list of all matters in which Joe Smith was involved, and a list of all other affected people in each of those matters. The derivation module 312 can then establish a list of all affected people who have been involved in the same legal matters as Joe Smith. Exemplary embodiments may then further prioritize the list of affected people based on how many legal matter they have in common (i.e., more matter in common means stronger correlation). The list of affected people may also be prioritized based on how short the list of affected people are in each previous matter (e.g., two people both included in the same short list indicates a stronger correlation than two people both included in a longer list). As such, the prioritization may be based, in this example, on the strength of correlation between affected people.

In some embodiments, the strength of correlation may be weighted. For example, if a current matter is an employment matter, then the other scope parameters may be weighted more heavily if the other scope parameters are also associated with an employment matter.

In another embodiment, the derivation module 312 may utilize a similar matter correlation process to determine refined scope parameters. In this embodiment, previous matters having a similar pattern of involvement in terms of affected entities or projects may be identified and corresponding lists of affected entities from the previous matter may be reused at least in part. In this instance, the initial scope parameter comprises a new matter. Derivation processing may be performed to identify the affected entities and objects associated with the current matter. The derivation module 312 may then perform a further derivation to determine other previous matters associated with the identified affected entities or objects. A correlation is then examined between the current and previous matters, such that if more connections to previous matters exist (e.g., more entities or objects in common between the two matters or less affected persons in common between the two matters), then the correlation is stronger. Based on the strength of the correlation, new affected entities and/or refined scope parameters may be identified (e.g., only strongly correlated entities or refined scope parameters may be selected).

For example, a new matter is created, and a list of eight affected people and two affected systems is established as a starting point (e.g., initial scope parameters). The derivation module 312 may perform a cross-check for any other matter in which any of these eight people and two systems have been involved in the past. Subsequently, a prioritization may be performed based on how many people and systems the affected people and systems share in common (e.g., strength of correlation analysis). The prioritization may be further refined by giving preference to correlation through people or systems that are rarely involved in legal matters (e.g., weighting the strength of correlation). Preference may also be given to a legal matter of similar type (e.g., litigation) versus a different type (e.g., employment). In exemplary embodiments, the user may review detailed information of each correlated matter, starting with a highest priority, and decide based on those details and his judgment if the matter is truly similar and can be used as reference to source other potential affected people or systems (e.g., as a refined scope parameter).

With respect to the previous two embodiments, a threshold for selection based on the strength of correlation as well as weights applied to adjust the strength of correlation may be provided. In some embodiments, the threshold and weights may be preset to a default provided to the derivation module 312. In other embodiments, the threshold and weights may be manually determined by a user. The manual determination may be on a case-by-case basis, on a selected number of matters, or on any combination of matters. It should be noted that the strength of correlation analysis may be performed by the derivation module 312 or another module associated with the litigation management engine 304.

In yet another embodiment, the derivation module 312 determines affected entities based on a review of previously collected data (e.g., documents) from previous matters. In one instance, the review may be based on a keyword search. That is, a search may be performed on content of collected data to identify any collected data that refer to one or more key terms. In an alternative case, the review may be based on a date range filter such that a search may be performed on the objects (e.g., metadata) of the collected data for indications of data creation, last modification, last access, or any combination thereof. Based on the review, affected entities may be identified from a total count returned from the search (e.g., a larger number of collected documents from a single entity increases probability the entity should be added to the list of affected entities). Additionally or alternatively, collected data with highly distinctive characteristics from a particular entity (e.g., contains extremely rare keywords) may increase probability the entity should be added to the list of affected entities.

Once the list of affected entities with potential information or knowledge relevant to the matter is identified by the derivation module 312, the list may be stored, for example, by legal matter. As such, this new list may later be used by the derivation module 312 in scoping future new matters. In exemplary embodiments, the list is stored in the legal matter repository 306. The list may be stored with additional information including, for example, attorney or paralegal data, matter status (e.g., active, closed), and list of collected data.

In various embodiments, the derivation process including refinement of scope parameters is entirely automated (e.g., performed by the legal matter management system 110). In other embodiments, manual review of some derivation results may be required in order to refine scope parameters. Based on the manual review, refined scope parameters may then be provided to the scope management module 310.

Based on the results of the derivation, various workflow and notifications may be generated. The workflow and notifications will be discussed in more detail in connection with the LCC engine 302 in FIG. 4.

The exemplary user interface module 314 is configured to allow the user to utilize the litigation management engine 110 to derive a list of key people and/or systems. In some embodiments, the user interface module 314 provides a graphical user interface (GUI) which allows the user to create the matter and provide the scope parameters for the derivation. In further embodiments, the user interface module 314 provides GUIs for showing results of the derivation. In some embodiments, the user interface module 314 may be optional.

The legal matter repository 306 may also store collected data from affected entities and tracked historical data. As will be discussed further, historical data may be captured for all matters stored in the legal matter repository 306. The historical data may comprise list of collected data and when the data was collected, when notifications were sent, when confirmations or responses were received, when and why entities were added or removed from the list, and so forth.

While FIG. 3 shows the LCC engine 302 and the litigation management engine 304 as separate engines, alternative embodiments may combine the two engines 302 and 304 into a single engine. In further embodiments, some of the modules within the two engines 302 and 304 may be interchangeably placed in the other engine 304 and 302.

Figure 4:
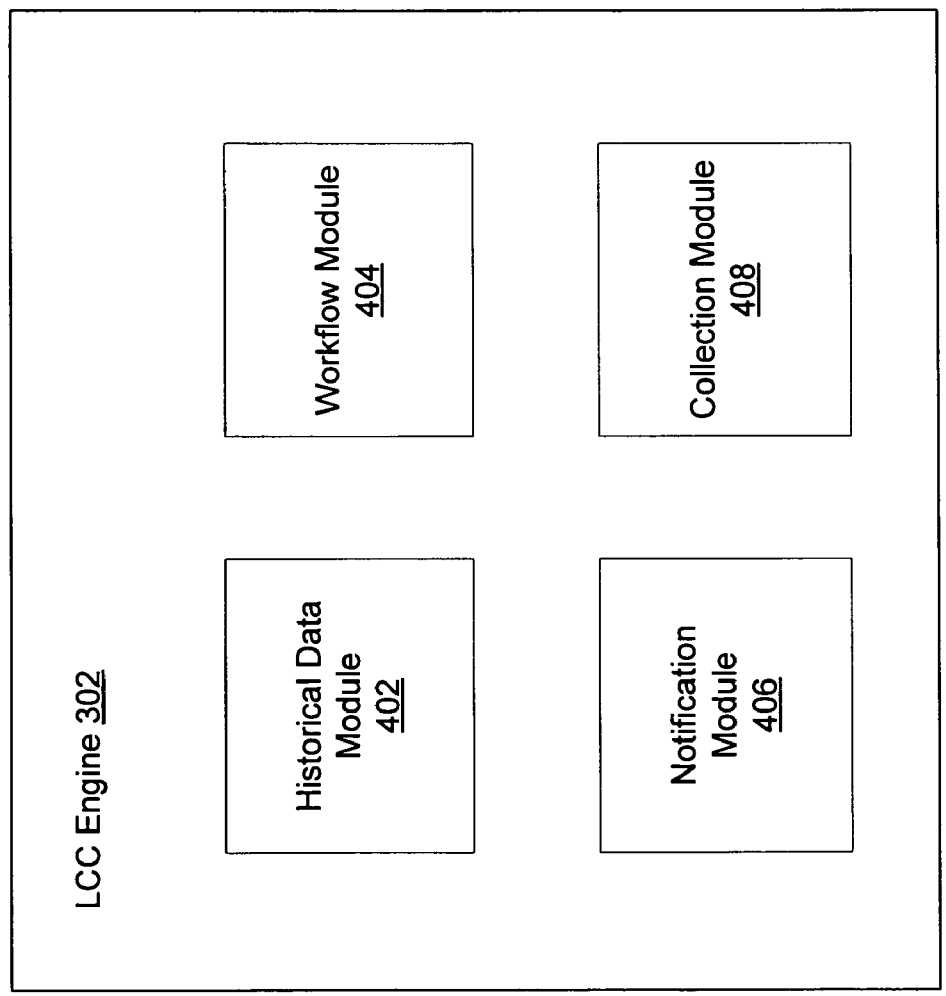
FIG. 4 is a block diagram of an exemplary legal communication and collection engine.

Referring now to FIG. 4, the exemplary LCC engine 302 is shown in more detail. The LCC engine 302 is configured to allow users 102 to manage communication and collections of data from affected entities. In exemplary embodiments, the LCC engine 302 comprises a historical data module 402, workflow module 404, notification module 406, and collection module 408.

The exemplary historical data module 402 is configured to track and leverage key information (i.e., historical data) associated with the previous matters stored in the legal matter repository 306. Essentially, the historical data module 402 builds a history of how everything associated with the enterprise map relates to previous matters and all the actions that were taken during the processes associated with the previous matters. In some embodiments, the historical data may be stored in an associated database (not shown). In an alternative embodiment, the historical data may be stored in a database associated with the enterprise map or in the legal matter repository 306.

In exemplary embodiments, historical data may comprise a list of affected entities determined for previous matters and reasons for why affected entities are added or removed from these lists. Furthermore, organizations, document types, OSCC, information types, and any other objects may be identified and associated with each previous matter. Further information on actions associated with previous matters such as communications exchanged, legal holds received by affected persons, which class of information was put on hold, and which information was collected may also be tracked by the historical data module 402.

With respect to affected people, details regarding relationships that each affected person has with any previous matter may be recorded. For example, notifications received from a legal team regarding preservation, collection, and interviews may be tracked by the historical data module 402. Responses from the affected person (e.g., confirmation, answers, collected documents) are also recorded.

In terms of the affected systems, detailed relationships associated with each affected system for each previous matter is also tracked by the historical data module 402. For example, which instructions were enforced on the affected system (e.g., preservation or collection) and the associated custodians of the system may be tracked. Subsequent responses may also be captured. In some embodiments, the historical data module 402 may track history of each affected system in terms of every instance of information being moved at a certain point in time associated with the previous matters.

The exemplary workflow module 404 automatically determines workflow based on the search results from the derivation module 312, and in some embodiments, automatically performs the workflow. In exemplary embodiments, the list of affected entities drives processes to preserve and produce data associated with the affected entities. Workflow may also comprise identifying what protocols should be used to collect data from affected systems, and flagging any relevant data (e.g., records classification) and retention schedules. Workflow may further comprise tasking assignments and tracking for interviews. In exemplary embodiments, preservation workflow processes comprises sending legal hold notices to the affected people and planning and executing interviews with affected people. The legal hold notices will instruct the affected people not to destroy data related to the matter. The interviews, in turn, may determine additional scope parameters to apply to the matter. The interviews may also identify more affected entities, which may or may not be within the enterprise system 106. For example, a contractor may have been involved on the matter. Exemplary production workflow processes may comprise sending legal notices to produce the data or evidence. The production workflow process may also comprise automatic generation of a collection workflow. The collection workflow provides plans and plan execution to drive the entities and systems. The actions of the workflow module 404 may be tracked and recorded by the historical data module 402. For example, time of workflow generation, persons receiving the workflow, and type of workflow may be tracked.

The notification module 406 is configured to provide the notices based on the workflow determined by the workflow module 404. For example, if the workflow module 404 determines that a steward of a repository needs to be notified not to destroy documents associated with a particular OSCC over a certain time period, the notification module 406 may generate a template containing this information (e.g., the OSCC, time period, and steward name and contact information) which the user 102 can use to send the notification to the steward. In other embodiments, the notification may be automatically sent without user interaction. The actions of the notification module 406 may also be tracked and recorded by the historical data module 402. For example, a time, recipient, and type for each sent notification may be recorded.

In some embodiments, the collection module 408 may be provided to manage the collection of the requested documents. The collection module 408 may be configured to received responses to various notifications and workflow and store the responses an appropriate storage medium (e.g., the legal matter repository). The actions of the collection module 408 may be tracked and recorded, in accordance with exemplary embodiments, by the historical data module 402. Thus, each time an item of data is collected, the historical data module 402 may update the historical data to indicate a time of collection, type of collected data, where and who the collected data was received from, and so forth.

Figure 5:
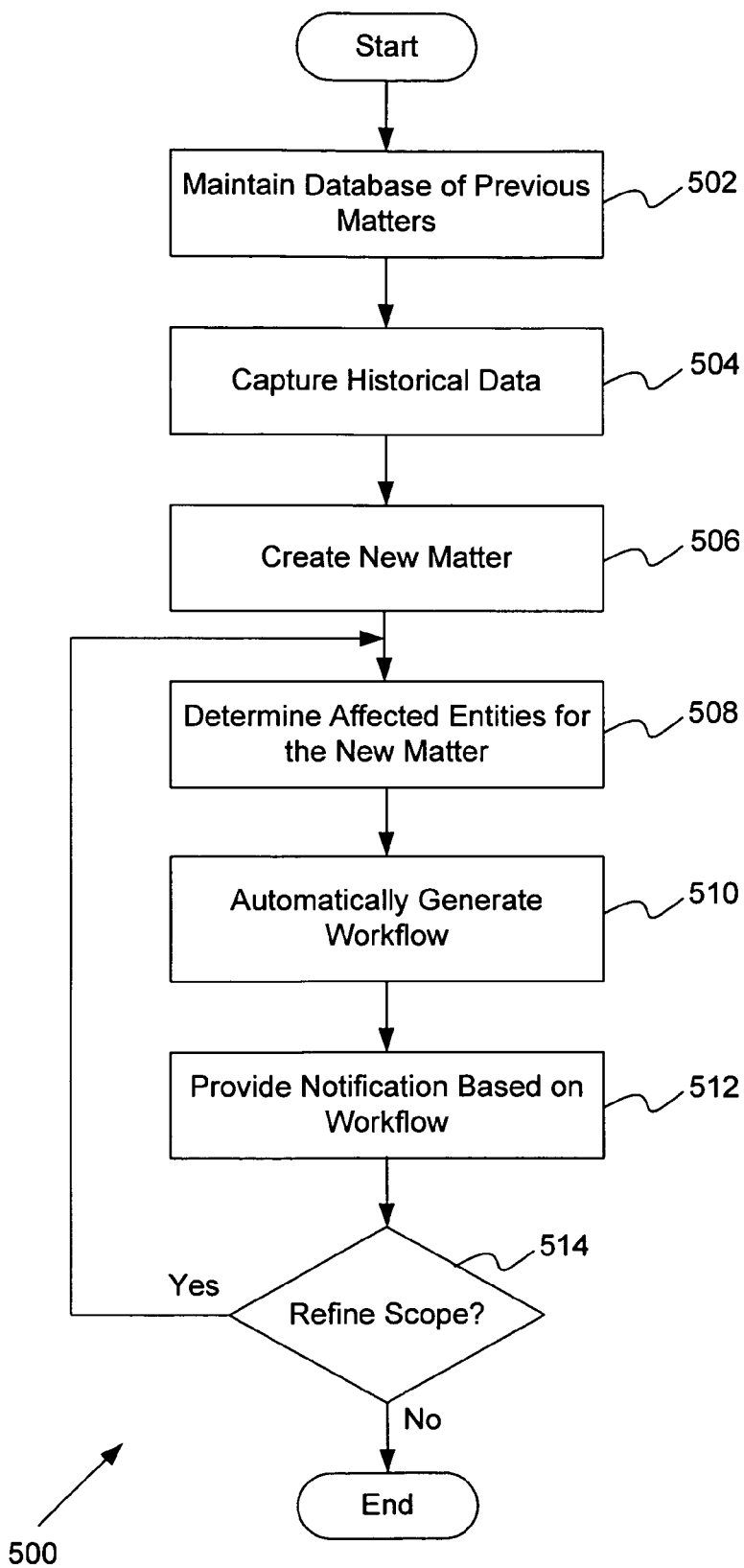
FIG. 5 is a flowchart of a method for determining affected entities.

Referring now to FIG. 5, a flowchart 500 of a method for leveraging historical data to determine affect entities is provided. In step 502, a database of previous matters is maintained. In some embodiments, the database may be comprised within the legal matter repository 306. The database may include, for example, lists of affected entities, workflows, notifications, and collected data, as well as any other relevant information associated with each matter.

In step 504, historical data is captured. In exemplary embodiments, each time an action occurs with respect to a matter, information regarding the action is tracked and recorded. For example, an affected person may receive a notification to preserve documents associated with a litigation matter and to provide the documents to an attorney working on the litigation matter. In this example, the historical data module 402 may track and capture associated dates (e.g., when notifications, responses, preservation of data, and data collection occur), what documents were preserved, what documents were collected, which attorney was involved, reasons for removing the affected person from the matter, and so forth. This historical information may be stored and leveraged by embodiments of the present invention to quick derive affected entities in new matters. It should be noted that step 504 is an ongoing process, and may occur at any time.

In step 506, a new (current) matter is created. In exemplary embodiments, the exemplary matter module 308 creates and maintains the new matter. The matter identifies a legal matter for which affected entities are being determined (e.g., derivation of a list of affected entities). The matter may also identify the attorneys and other staff that are working on the matter.

A list of affected entities for the new matter is determined in step 508. The affected entities may comprise people and systems that may be involved in the matter and may need to perform some action with respect to the matter (e.g., preserve data, provide data, be interviewed). Step 508 will be discussed in more detail in connection with FIG. 6.

Once the affected people and systems are identified, workflow may be automatically generated in step 510. In exemplary embodiments, the workflow module 404 generates workflow for the user, legal staff, and/or affected people. Notifications based on the workflow may be provided in step 512 to the affect people. Other processes may also be performed based on the generated workflow. For example, interviews may be conducted with affected people in order to determine more, for example, more scope parameters which should be investigated.

In optional step 514, the scope for the derivation of a list of affected people and/or systems may be refined. In some embodiments, the user may review the results and narrow the scope parameters or provide additional scope parameters. If the scope is refined, a new determination of key people and systems may be performed in step 508. In an alternative embodiment, the scope may be refined after the determination of key people and systems (step 508) and before any workflow is generated (step 510) as will be discussed in connection with FIG. 6.

Figure 6:
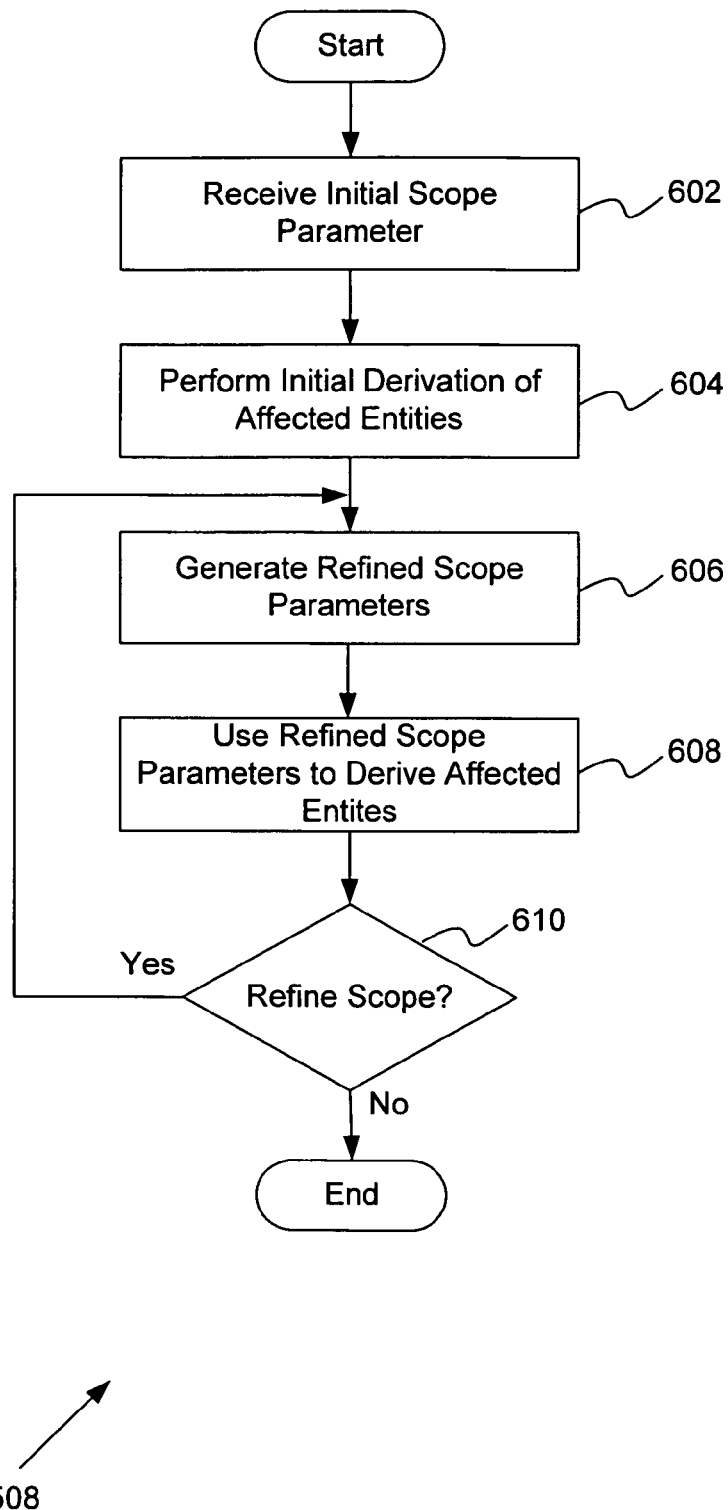
FIG. 6 is a flowchart of a method for leveraging historical data to determine affected entities.

Referring now to FIG. 6, a flowchart of an exemplary method for determining affected entities for the new matter (step 508) is shown. In step 602, initial scope parameters are received. When the new matter is created, the user may provide initial scope parameters via a GUI on their user device 102. The initial scope parameters identify root elements or objects in the map that may be used as a starting point of a search. Initial scope parameters may comprise, for example, related previous matters, known affected people or systems, or an OSCC, information type, organization, and/or document of interest.

Based on the initial scope parameters the derivation module 312 determines an initial list of affected entities in step 604. In exemplary embodiments, the map is traversed to determine the affected entities based on relationships identified within the map. Thus, knowing at least one root element/parameter (e.g., an object) associated with the matter, further elements/parameters and/or the affected people and systems may be derived. It should be noted that step 604 may be optional.

In step 606, refined scope parameters may be generated. In exemplary embodiments, the initial scope parameters and optionally derived scope parameters from step 604 (e.g., affected entities, related objects) may be cross-referenced with historical data and/or the map to determine further scope parameters. The cross-referencing may be performed, in accordance with some embodiments, by the derivation module 312.

The refined scope parameters may be used to derive affected entities in step 608. It should also be noted that further objects and parameters may be determined during the derivation process of step 608.

Subsequently, a determination may be made as to whether further refinement of the scope should be performed in step 610. If further refinement is desired, then the results of the previous refinement (step 606) and previous derivation (step 608) may be used to generate further refined scope parameters.

Figure 7:
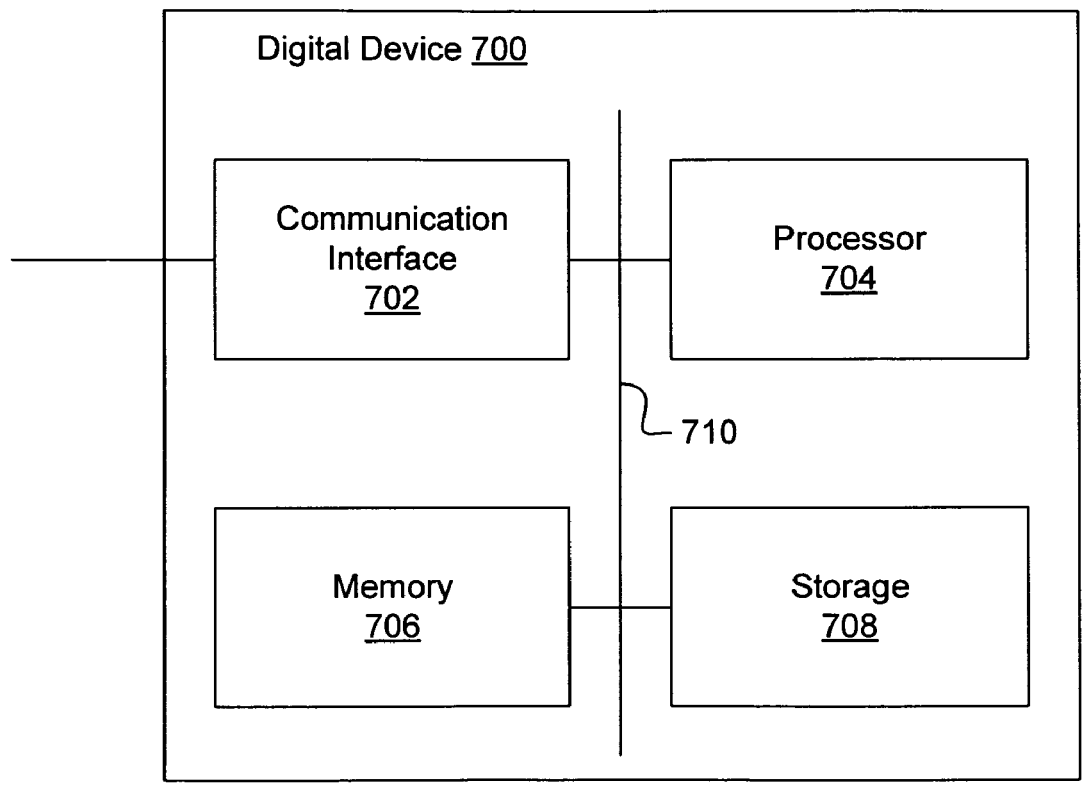
FIG. 7 is a block diagram of an exemplary digital device.

FIG. 7 shows an exemplary digital device 700. The digital device 700 may comprise the user device 102, the enterprise system 106, map engine 108, and/or the legal matter management system 110 according to various embodiments. The digital device 700 comprises, at least, a communications interface 702, processor 704, memory 706, and storage 708, which are all coupled to a bus 710. The bus 710 provides communication between the communications interface 702, processor 704, memory 706, and storage 708.

The processor 704 executes instructions. The memory 706 permanently or temporarily stores data. Some examples of memory 706 are RAM and ROM. The storage 708 also permanently or temporarily stores data. Some examples of the storage 708 are hard disks and disk drives.

The above-described functions and components can be comprised of instructions that are stored on a storage medium. The instructions can be retrieved and executed by a processor (e.g., the processor 704). Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A method for leveraging historical data to determine affected entities, comprising:
   receiving at least one initial scope parameter for a current legal matter of an enterprise via a communications interface of at least one digital device;
   deriving a first list of affected entities associated with the current legal matter based on the at least one initial scope parameter, an affected entity comprising at least one of an employee who may have relevant data and an affected system where potentially relevant information may reside;
   executing instructions stored in memory on a processor to:
      access historical data associated with the first list of affected entities derived based on the at least one initial scope parameter, the historical data comprising generated information based on tracking of actions performed within the enterprise as depicted in an enterprise map that represents relationships between people, repositories, organizations, and documents of the enterprise; and
      determine one or more refined scope parameter based on the historical data by cross-referencing the at least one initial scope parameter with at least one of the historical data and the enterprise map; and
   providing a second list of affected entities based at least on the one or more refined scope parameter to the at least one digital device via the communications interface, each affected entity on the second list of affected entities listed also on the first list of affected entities.

2. The method of claim 1 wherein the at least one refined parameter comprises an affected entity.

3. The method of claim 1 further comprising capturing and storing the historical data.

4. The method of claim 1 wherein capturing the historical data comprises tracking actions performed with respect to previous legal matters.

5. The method of claim 1 further comprising creating a new legal matter associated with the at least one initial scope parameter.

6. The method of claim 1 further comprising using the generated list of affected entities to further refine the at least one initial scope parameter using the historical data.

7. The method of claim 1 wherein determining at least one refined scope comprises using results of a previous derivation.

8. The method of claim 7 wherein the results comprise a list of one or more affected objects.

9. The method of claim 1 wherein determining at least one refined scope comprises generating a list of affected entities using the initial scope parameters.

10. The method of claim 1 wherein determining at least one refined scope comprises identifying past affiliation of affected entities.

11. The method of claim 1 wherein determining at least one refined scope comprises extracting refined scope parameters based on the historic data for a known previous legal matter.

12. The method of claim 1 wherein determining at least one refined scope comprises identifying the at least one refined scope parameter based on similar patterns of relationships shared with the initial scope parameters.

13. The method of claim 12 further comprising ranking the at least one refined scope parameter based on a strength of correlation.

14. The method of claim 1 wherein determining at least one refined scope parameter comprises utilizing a similar matter correlation process to determine the at least one refined scope parameter.

15. The method of claim 1 wherein determining at least one refined scope parameter comprises reviewing previously collected data associated with previous legal matters.

16. The method of claim 1 wherein providing the list of affected entities comprises deriving the list based, at least, on the refined scope parameters.

17. The method of claim 16 further comprising utilizing the enterprise map to search for the refined scope parameters.

18. The method of claim 1 further comprising generating workflow based on the list of affected entities.

19. A system for leveraging historical data to determine affected entities, comprising:
    a server coupled to one or more network-enabled digital devices, the server comprising:
    a scope management module configured to receive at least one initial scope parameter for a current legal matter of an enterprise;
    a historical data module configured to track actions associated with previous legal matters to create and maintain historical data, the historical data comprising generated information based on tracking of actions performed within the enterprise on previous legal matters depicted in an enterprise map that represents relationships between people, repositories, organizations, and documents of the enterprise; and
    a derivation module configured to determine one or more refined scope parameter based on the historical data by cross-referencing the at least one initial scope parameter with at least one of the historical data and the enterprise map, and configured to derive a first list of affected entities associated with the current legal matter based on the at least one initial scope parameter, an affected entity comprising at least one of an employee who may have relevant data and an affected system where potentially relevant information may reside and provide a second list of affected entities based at least on the one or more refined scope parameter, each affected entity on the second list of affected entities listed also on the first list of affected entities.

20. A non-transitory computer readable storage medium having embodied thereon a program, the program executable by a processor to perform a method for leveraging historical data to determine affected entities, the method comprising:
    receiving at least one initial scope parameter for a current legal matter of an enterprise;
    accessing historical data associated with the at least one initial scope parameter, the historical data comprising generated information based on tracking of actions performed within the enterprise on previous legal matters depicted in an enterprise map that represents relationships between people, repositories, organizations, and documents of the enterprise;
    determining one or more refined scope parameter based on the historical data by cross-referencing the at least one initial scope parameter with at least one of the historical data and the enterprise map;
    deriving a first list of affected entities associated with the current legal matter based on the at least one initial scope parameter, an affected entity comprising at least one of an employee who may have relevant data and an affected system where potentially relevant information may reside; and
    providing a second list of affected entities based at least on the one or more refined scope parameter, each affected entity on the second list of affected entities listed also on the first list of affected entities.

* * * * *